United States Patent
Johnson et al.

(10) Patent No.: US 11,775,941 B2
(45) Date of Patent: Oct. 3, 2023

(54) SYSTEM AND METHOD FOR PROMPTING VEHICLE SERVICE BASED ON PROXIMITY AND WAIT TIME

(71) Applicant: Toyota Motor North America, Inc., Plano, TX (US)

(72) Inventors: Michael Lang Johnson, Frisco, TX (US); Melvin W. Sullivan, McKinney, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 664 days.

(21) Appl. No.: 16/510,116

(22) Filed: Jul. 12, 2019

(65) Prior Publication Data

US 2021/0012297 A1    Jan. 14, 2021

(51) Int. Cl.
| G06Q 10/20 | (2023.01) |
| G07C 5/00 | (2006.01) |
| G08G 1/00 | (2006.01) |

(52) U.S. Cl.
CPC ............. *G06Q 10/20* (2013.01); *G07C 5/006* (2013.01); *G08G 1/202* (2013.01)

(58) Field of Classification Search
None
See application file for complete search history.

(56) References Cited

U.S. PATENT DOCUMENTS

| 5,445,347 A * | 8/1995 | Ng | ............................ | G08G 9/00 |
| | | | | 246/169 R |
| 6,526,335 B1 * | 2/2003 | Treyz | .................... | H04W 4/029 |
| | | | | 701/1 |

(Continued)

FOREIGN PATENT DOCUMENTS

| CN | 103676923 A | 3/2014 | |
| CN | 108501958 A | 9/2018 | |
| EP | 2717016 A1 * | 4/2014 | ............. G01C 21/34 |
| IN | 2012MU00587 A | 9/2013 | |

(Continued)

OTHER PUBLICATIONS

S. Kumar, M. A. Qadeerand A. Gupta, "Location based services using android (LBSOID)," 2009 IEEE International Conference on Internet Multimedia Services Architecture and Applications (IMSAA), 2009, pp. 1-5, doi: 10.1109/IMSAA.2009.5439442. (Year: 2009).*

(Continued)

*Primary Examiner* — Paul R Fisher
(74) *Attorney, Agent, or Firm* — DINSMORE & SHOHL LLP

(57) ABSTRACT

A system for prompting vehicle service includes: a processor; a memory module communicatively coupled to the processor and including one or more processor-readable instructions that, when executed by the processor, cause the system to: determine a vehicle location; determine one or more maintenance tasks required by the vehicle; identify a maintenance facility capable of performing the one or more maintenance tasks; determine a location of the maintenance facility capable of performing the one or more maintenance tasks; determine a wait time to perform the one or more maintenance tasks at the maintenance facility; and output a maintenance scheduling prompt based on: a comparison between the wait time and a wait time threshold, and a second comparison between: (i) a magnitude of a distance between the vehicle and the maintenance facility; and (ii) a distance threshold.

18 Claims, 5 Drawing Sheets

(56) References Cited

U.S. PATENT DOCUMENTS

| | | | |
|---|---|---|---|
| 7,113,892 B2 * | 9/2006 | Inoue | G06Q 10/10 |
| | | | 702/187 |
| 8,060,282 B2 | 11/2011 | Breed | |
| 9,773,265 B2 * | 9/2017 | Sharpley | A47J 31/521 |
| 9,783,137 B2 | 10/2017 | Jeong et al. | |
| 9,817,400 B1 * | 11/2017 | Poeppel | H04L 67/306 |
| 10,049,505 B1 * | 8/2018 | Harvey | G06Q 10/20 |
| 2002/0181685 A1 * | 12/2002 | Doherty | H04L 41/5064 |
| | | | 379/201.12 |
| 2003/0061078 A1 * | 3/2003 | Shimosako | G06Q 10/02 |
| | | | 705/5 |
| 2008/0319935 A1 * | 12/2008 | Chandak | G06Q 30/0236 |
| | | | 706/45 |
| 2011/0093158 A1 | 4/2011 | Theisen et al. | |
| 2013/0103825 A1 * | 4/2013 | Martikainen | H04L 41/0896 |
| | | | 709/224 |
| 2014/0195153 A1 * | 7/2014 | Barrett | G01C 21/3682 |
| | | | 701/516 |
| 2014/0344062 A1 * | 11/2014 | Lamont | H04W 4/80 |
| | | | 705/14.64 |
| 2015/0019354 A1 * | 1/2015 | Chan | A47J 37/00 |
| | | | 705/15 |
| 2015/0338852 A1 * | 11/2015 | Ramanujam | G08G 1/202 |
| | | | 701/2 |
| 2016/0019641 A1 * | 1/2016 | Barnett | G06Q 20/108 |
| | | | 705/35 |
| 2016/0079787 A1 * | 3/2016 | Yechieli | H02J 3/14 |
| | | | 320/138 |
| 2016/0092944 A1 * | 3/2016 | Taylor | G06Q 10/02 |
| | | | 705/5 |
| 2016/0260032 A1 * | 9/2016 | Woon | G06Q 10/02 |
| 2017/0219368 A1 * | 8/2017 | Meredith | G01C 21/3484 |
| 2017/0364869 A1 * | 12/2017 | Tarte | G06Q 10/1095 |
| 2018/0283889 A1 * | 10/2018 | Koo | G01C 21/3484 |

FOREIGN PATENT DOCUMENTS

| | | | | |
|---|---|---|---|---|
| KR | 101369596 B1 | | 3/2014 | |
| WO | WO02103594 A1 | * | 12/2002 | G06Q 10/06 |
| WO | WO2017156586 A1 | * | 9/2017 | G06Q 10/08 |

OTHER PUBLICATIONS

Fathollah Amouzegar & Ahmed Patfi, "Vehicle Maintenance Notification System Using RFID Technology," URL: http://www.ijcte.org/papers/700-P037.pdf, International Journal of Computer Theory and Engineering, vol. 5, No. 2, Apr. 2013.

* cited by examiner

SYSTEM AND METHOD FOR PROMPTING VEHICLE SERVICE BASED ON PROXIMITY AND WAIT TIME

TECHNICAL FIELD

The present specification generally relates to systems and methods for prompting vehicle service and more specifically to systems and methods for prompting vehicle service based on a proximity of a vehicle to a service center and a wait time for vehicle service at the service center.

BACKGROUND

Vehicle maintenance may be periodically required. However, in some cases, a user (e.g., a vehicle owner, lessee, operator, and the like) may not actively track maintenance requirements. Accordingly, he or she may not know when any particular maintenance item is due. Moreover, the capability for performing maintenance may be limited to distinct locations (e.g., a vehicle service center, a car dealership, and the like). Vehicles may often operate outside of a convenient proximity to such maintenance facilities. Moreover, a wait time to have maintenance performed at a first maintenance facility may be substantial while other maintenance facilities may offer maintenance services with little or no wait for the user. Accordingly, systems and methods for prompting vehicle service based on proximity to maintenance facilities and a wait time at the maintenance facility may be desired.

SUMMARY

In one embodiment, a system for prompting vehicle service includes: a processor; a memory module communicatively coupled to the processor and including one or more processor-readable instructions that, when executed by the processor, cause the system to: determine a vehicle location; determine one or more maintenance tasks required by the vehicle; identify a maintenance facility capable of performing the one or more maintenance tasks; determine a location of the maintenance facility capable of performing the one or more maintenance tasks; determine a wait time to perform the one or more maintenance tasks at the maintenance facility; and output a maintenance scheduling prompt based on: a comparison between the wait time and a wait time threshold, and a second comparison between: (i) a magnitude of a distance between the vehicle and the maintenance facility; and (ii) a distance threshold.

In another embodiment, a vehicle includes: a processor; a memory module communicatively coupled to the processor and including one or more processor-readable instructions that, when executed by the processor, cause the vehicle to: determine a vehicle location; determine one or more maintenance tasks required by the vehicle; identify a maintenance facility capable of performing the one or more maintenance tasks; determine a location of the maintenance facility capable of performing the one or more maintenance tasks; determine a wait time to perform the one or more maintenance tasks at the maintenance facility; and output a maintenance scheduling prompt based on: a comparison between the wait time and a wait time threshold, and a second comparison between: (i) a magnitude of a distance between the vehicle and the maintenance facility; and (ii) a distance threshold.

In yet another embodiment, a method of prompting service for a vehicle comprising: determining a vehicle location; determining one or more maintenance tasks required by the vehicle; identifying a maintenance facility capable of performing the one or more maintenance tasks; determining a location of the maintenance facility capable of performing the one or more maintenance tasks; determining a wait time to perform the one or more maintenance tasks at the maintenance facility; and outputting a maintenance scheduling prompt based on: a comparison between the wait time and a wait time threshold, and a second comparison between: (i) a magnitude of a distance between the vehicle and the maintenance facility; and (ii) a distance threshold.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles may include one or more systems for prompting vehicle service based on a proximity and a wait time, for example, a proximity of the vehicle to a service center and a wait time at the service center. Such systems may include one or more sensors for determining the location of the vehicle. For example, a GPS system may determine a location of a vehicle and generate GPS data based on the location of the vehicle. The vehicle may be further configured to determine a location of one or more maintenance centers. For example, the vehicle may be configured to receive data from an external network that may be used to determine the location of one or more maintenance centers and, in some embodiments, to display the location of the maintenance centers on a display. Additionally, the vehicle may be configured to determine a wait time at particular maintenance centers. For example, the vehicle may be configured to receive data from an external network that may be used to track the wait time at particular maintenance centers. Based on a determination of the vehicle, a maintenance center, and a wait time at a maintenance center, the vehicle may prompt one or more vehicle maintenance items (e.g., oil change, tire pressure increase or decrease, tire rotation, etc.).

Figure 1:
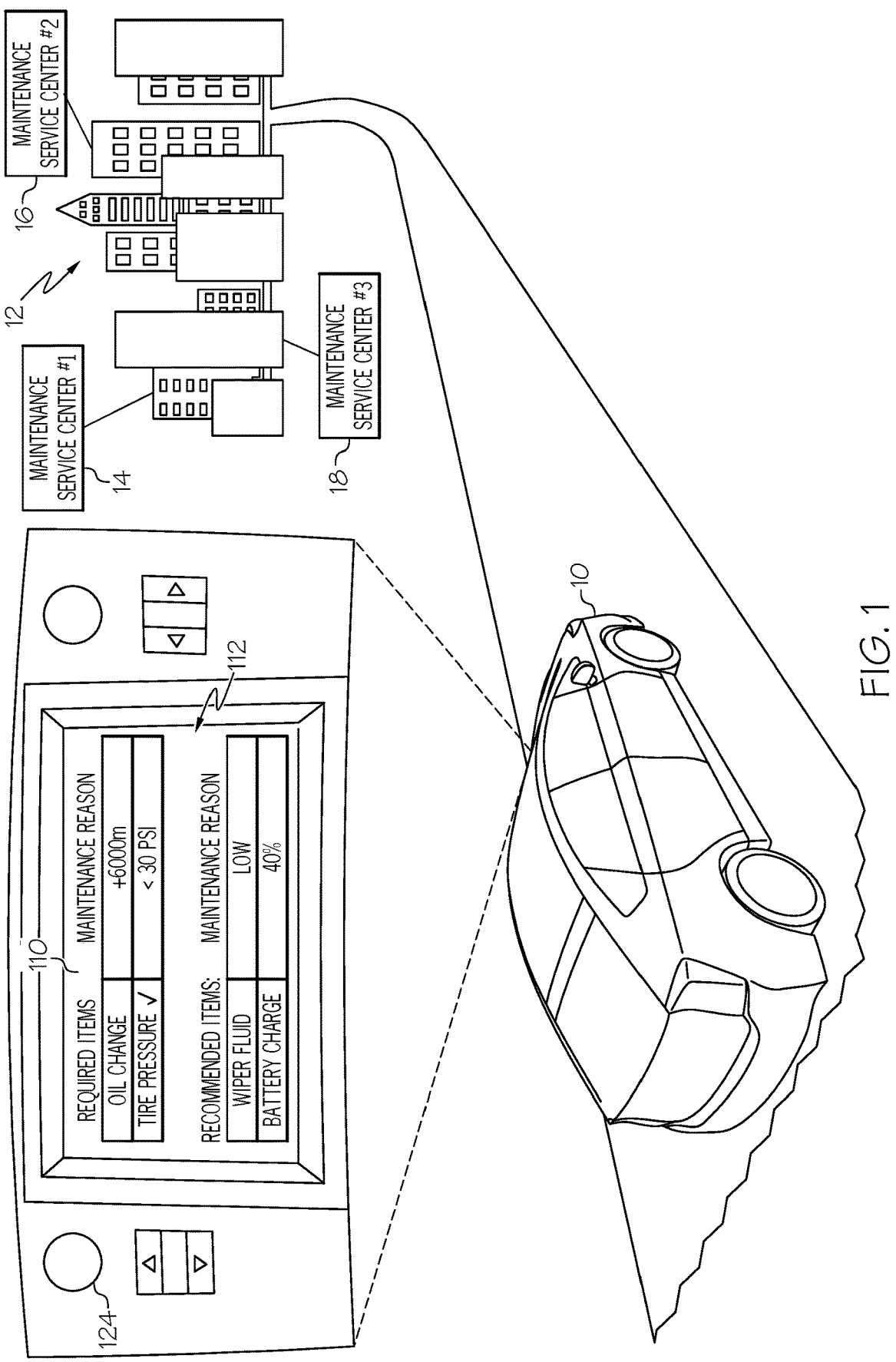
FIG. 1 schematically depicts a vehicle including a system for prompting vehicle service based on a proximity of the vehicle to a service center and a wait time, according to one or more embodiments shown and described herein.

Referring now to FIG. 1, a vehicle 10 that includes a system 100 (see FIG. 2) for prompting vehicle service based on a proximity of a vehicle to a service center and a wait time for vehicle service at the service center. The vehicle 10 includes a display 110 that may display images and text in a graphical user interface (GUI) 112. The display 110 may be, for example, a heads-up-display for a vehicle and the GUI 112 may display information, such as, for example, one or more required or recommended maintenance items as will be described in greater detail herein. The display 110 may include various input mechanisms, such as the display 110 itself (which may be a touch-sensitive display) and an input device 124. The input mechanisms may be used to affect one or more changes to the system 100.

Still referring to FIG. 1, the vehicle 10 may operate in an area 12 within multiple maintenance service centers. The particular depicted example in FIG. 1 shows a first maintenance center 14, a second maintenance center 16, and a third maintenance center 18, but it is to be understood that these are merely illustrative and the number of maintenance centers about which the vehicle 10 can receive and/or determine information is not limited by this disclosure.

Figure 2:
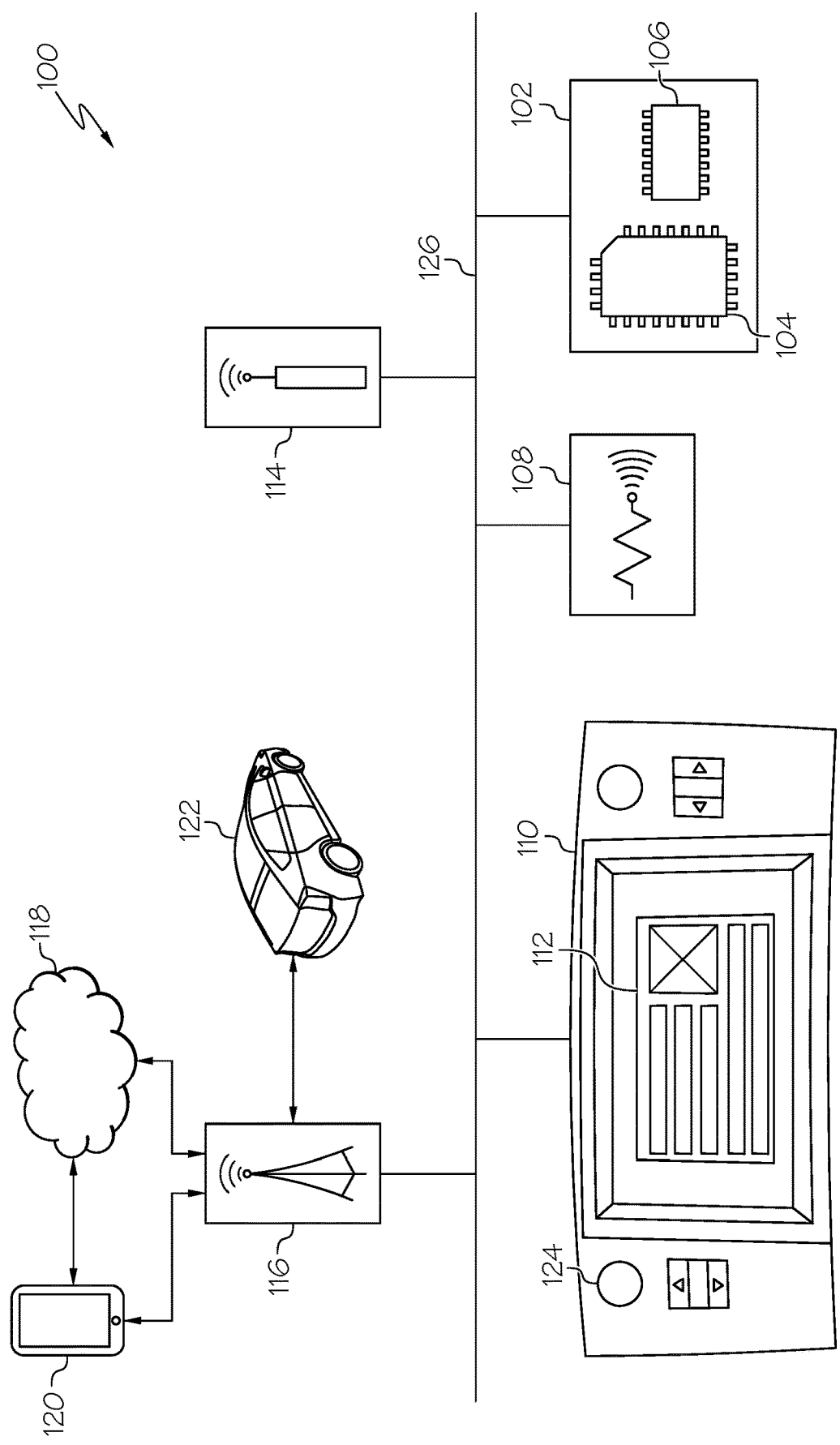
FIG. 2 schematically depicts internal hardware components of the system of FIG. 1, according to one or more embodiments shown and described herein.

Referring now to FIG. 2, the system 100 includes an electronic control unit 102 including a processor 104 and a memory module 106. Embodiments of the system 100 may further include a sensor module 108, the display 110 that may display the GUI 112, a navigation module 114 that may include position locating hardware, network interface hardware 116, and the input device 124. The network interface hardware 116 may communicatively couple one or more of the system components with, for example, an external network 118, a personal electronic device 120, and one or more external vehicles like external vehicle 122. The components of the system 100 may be communicatively coupled via a bus 126.

As noted above, the system 100 includes the bus 126. The bus 126 may be formed from any medium that is capable of transmitting a signal such as, for example, conductive wires, conductive traces, optical waveguides, or the like. Moreover, the bus 126 may be formed from a combination of mediums capable of transmitting signals. In one embodiment, the bus 126 comprises a combination of conductive traces, conductive wires, connectors, and buses that cooperate to permit the transmission of electrical data signals to components such as processors, memories, sensors, input devices, output devices, and communication devices. Accordingly, the bus 126 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The bus 126 communicatively couples the various components of the system 100. As used herein, the term "communicatively coupled" means that coupled components are capable of exchanging data signals with one another such as, for example, electrical signals via conductive medium, electromagnetic signals via air, optical signals via optical waveguides, and the like.

As noted above, the system 100 includes the electronic control unit 102. The electronic control unit 102 includes the processor 104. It is to be understood that the system 100 may include one or more processors similar to the processor 104. The processor 104 may be any device capable of executing processor-readable instructions. Accordingly, the processor 104 may be a controller, an integrated circuit, a microchip, a computer, or any other computing device. The processor 104 is communicatively coupled to the other components of the system 100 by the bus 126. Accordingly, the bus 126 may communicatively couple any number of processors with one another, and allow the modules coupled to the bus 126 to operate in a distributed computing environment. Specifically, each of the modules may operate as a node that may send and/or receive data.

As noted above, the system 100 includes the memory module 106. The memory module 106 is coupled to the bus 126 and communicatively coupled to the processor 104. The memory module 106 may comprise RAM, ROM, flash memories, hard drives, or any device capable of storing processor-readable instructions such that the processor-readable instructions may be accessed and executed by the processor 104. The processor-readable instructions may comprise logic or algorithm(s) written in any programming language of any generation (e.g., 1GL, 2GL, 3GL, 4GL, or 5GL) such as, for example, machine language that may be directly executed by the processor 104, or assembly language, object-oriented programming (OOP), scripting languages, microcode, etc., that may be compiled or assembled into processor-readable instructions and stored on the memory module 106. In some embodiments, the processor-readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The system 100 may further include the sensor module 108. The sensor module 108 may utilize any one or more sensors that may be communicatively coupled to the processor 104 for detecting one or more sensed objects or conditions. The one or more sensors may be used in conjunction with vehicle-to-vehicle communication or alone. The one or more sensors can include, but are not limited to, imaging devices (e.g., cameras), light detection and ranging (LIDAR) systems, RADAR systems, proximity sensors, fluid sensors, pressure sensors, speed sensors, voltage sensors, current sensors, chemical sensors such as oxygen or $CO_2$ sensors, and any other type of sensor for sensing one or more objects or conditions. Multiple types of sensors can be used to provide a variety of information regarding conditions of the vehicle itself or conditions of objects in the area adjacent to the vehicle.

The display 110 may provide visual output such as, for example, messages and other information, entertainment, maps, navigation, information, or a combination thereof. The display 110 may be communicatively coupled to the processor 104 via the bus 126. Accordingly, the bus 126 communicatively couples the display 110 to other modules of the system 100. The display 110 may include any medium capable of transmitting an optical output such as, for example, a cathode ray tube, light emitting diodes, a liquid crystal display, a plasma display, or the like. Moreover, the display 110 may be a touchscreen that, in addition to providing optical information, detects the presence and location of a tactile input upon a surface of or adjacent to the display. Accordingly, each display 110 may receive mechanical input directly upon the optical output provided by the display. Additionally, it is noted that the display 110 may include at least one processor similar to the processor 104 and one memory module similar to the memory module 106. While the system 100 includes a display 110 in the depicted embodiment, the system 100 may include multiple displays or may not include a display 110 in other embodiments.

The navigation module 114 may include position location hardware and may be communicatively coupled to the processor 104 and/or to other modules of the system 100 via the bus 126. The navigation module 114 may be configured to receive signals from global positioning system satellites or other position locating devices (e.g., cell network towers, GPS transponders, etc.) using, for example, position locating hardware. Specifically, in one embodiment, the navigation module 114 receives an input from hardware that includes one or more conductive elements that interact with electromagnetic signals transmitted by global positioning system satellites. The received signal may be transformed into a data signal indicative of the location (e.g., latitude and longitude) of the system 100 by the processor 104. In embodiments where the system 100 is coupled to a vehicle, the processor 104 may execute machine readable instructions to transform the global positioning satellite signals or other signals received by the navigation module 114 into data indicative of the current location of the vehicle 10. While the system 100 includes the navigation module 114 in the embodiment depicted in FIG. 2, the system 100 may not include the navigation module 114 in other embodiments, such as embodiments in which the system 100 does not utilize global positioning satellite information or embodiments in which the system 100 obtains global positioning satellite information from a mobile device or other external device or network.

As noted above, the system 100 includes the network interface hardware 116 for communicatively coupling the system 100 with an external network. The network interface hardware 116 is coupled to the bus 126 such that the bus 126 communicatively couples the network interface hardware 116 to other modules of the system 100. The network interface hardware 116 may be any device capable of transmitting and/or receiving data via a wireless network. Accordingly, the network interface hardware 116 may include a communication transceiver for sending and/or receiving data according to any wireless communication standard. For example, the network interface hardware 116 may include a chipset (e.g., antenna, processors, processor-readable instructions, etc.) to communicate over wireless computer networks such as, for example, wireless fidelity (Wi-Fi), WiMax, Bluetooth®, IrDA, Wireless USB, Z-Wave, ZigBee, or the like. In some embodiments, the network interface hardware 116 includes a Bluetooth® transceiver that enables the system 100 to exchange information with an external network (e.g., a cellular network) or component (e.g., a smartphone) via Bluetooth® communication.

The input device 124 is provided for the user to communicate with the system 100. The input device 124 may be used by the user to complete tasks such as program preferences or settings, provide commands, and provide feedback to the system 100. The input device 124 may take on any appropriate form. For example, the input device 124 may be configured as a keyboard, buttons, switches, touch-sensitive pads or screens, microphones, and the like. Any appropriate user input device may be utilized.

Figure 3:
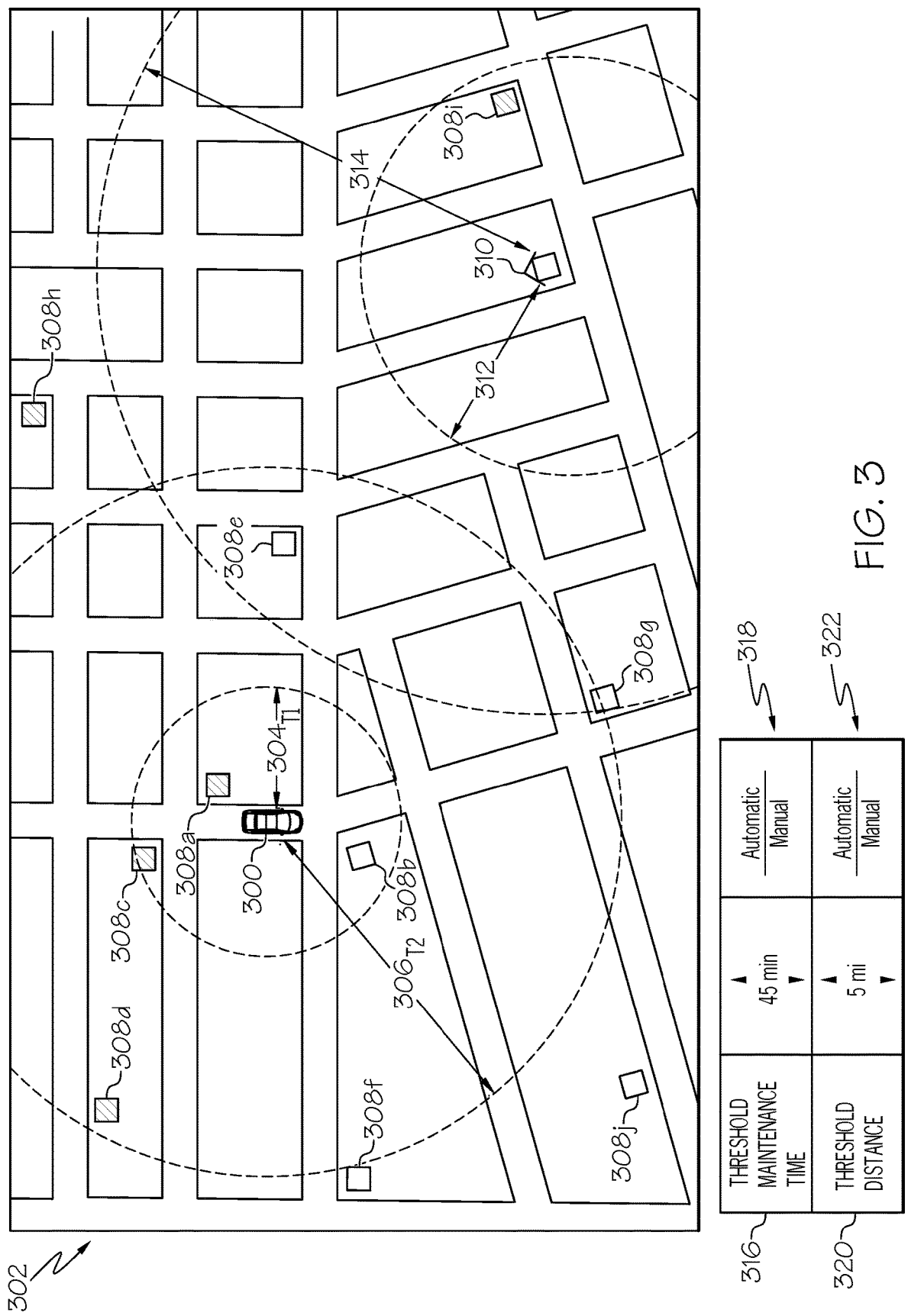
FIG. 3 schematically depicts a first illustrative embodiment of a graphical user interface, according to one or more embodiments shown and described herein.

Referring now to FIG. 3, an example embodiment of a graphical user interface that may be displayed on the display 110 is shown. FIG. 3 shows a vehicle 300 that is travelling through a system of streets in a first location 302. The vehicle 300, the system of streets in the first location 302, and other aspects described with respect to FIG. 3 may be depicted, for example, as a map using the GUI 112 on the display 110 shown in FIGS. 1 and 2. Accordingly, the system 100 may provide a user a visual representation of the location of the vehicle 300 as he or she drives from place to place.

A first distance threshold 304 and a second distance threshold 306 are depicted around the vehicle 300. Multiple maintenance facilities are shown around the vehicle 300. A first maintenance facility 308a, a second maintenance facility 308b, and a third maintenance facility 308c are depicted within the first distance threshold 304. A fourth maintenance facility 308d, a fifth maintenance facility 308e, a sixth maintenance facility 308f, and a seventh maintenance facility 308g are depicted within the second distance threshold 306. An eighth maintenance facility 308h, a ninth maintenance facility 308i, and a tenth maintenance facility 308j are depicted outside both the first distance threshold 304 and the second distance threshold 306 with respect to the vehicle 300.

Additionally, FIG. 3 depicts a proxy vehicle location 310, a first proxy distance threshold 312, and a second proxy distance threshold 314. A threshold maintenance time indication 316 indicates a threshold maintenance time, as described in greater detail herein. The threshold maintenance time may be adjustable using the threshold time input 318. The threshold distance may be indicated by the threshold distance indication 320. The threshold distance may be adjusted automatically by the system 100 or may be adjusted manually, for example, using the threshold distance input 322.

The threshold distance may be a distance that represents the maximum distance a user is willing to drive to have maintenance performed on his or her vehicle. In embodiments, the threshold distance may be a radius around the vehicle 300. For example, the threshold distance may encompass all maintenance facilities within a ten mile radius of the vehicle 300. In embodiments, the threshold distance may be a calculated driving distance from a first location (e.g., the location of the vehicle 300, the proxy vehicle location 310, etc.). For example, the threshold distance may be 10 miles from the vehicle 300 as calculated in driving distance. The threshold distance may be adjusted automatically or manually by a user. For example, a user may adjust the maintenance threshold distance from a first distance threshold 304 to the second distance threshold 306 (e.g., from a five mile radius to a ten mile radius) with the threshold distance input 322. A user may increase or decrease the threshold distance, for example, to increase or decrease the number of maintenance facilities within the threshold distance.

The threshold maintenance distance may be adjusted automatically based on one or more criteria. As one example, the threshold maintenance distance may be adjusted automatically based on a schedule of the user. The user's schedule may be determined, for example, using an email, contacts, or scheduling application on the personal electronic device 120. In embodiments, the threshold maintenance distance may be automatically determined based on one or more user maintenance preferences. For example, a user may prefer to use a particular vendor or maintenance center. The system 100 may determine user preferences using one or more machine learning algorithms. For example, the processor 104 may execute one or more processor-readable instructions stored in the memory module 106 to implement one or more machine learning algorithms that may determine a user's preference for, for example, a particular maintenance facility, vehicle part or parts, maintenance requirements, and the like. In some embodiments, data associated with maintenance preferences may be sent from the vehicle 300 to an external network and the machine learning algorithms may be performed externally from the vehicle 300 and processed data may be sent back to the vehicle 300. As another example, the threshold maintenance distance may be adjusted based on a fuel level of the vehicle 300. The sensor module 108 may receive an input from a fuel level sensor and the fuel level may be used to adjust the threshold maintenance distance based on the fuel level. As one example, if the vehicle 10 has sufficient fuel to travel a given distance, the threshold maintenance distance may be set to the given distance or some portion thereof. Additionally, it is to be understood that the various criteria for automatically adjusting the threshold maintenance distance is not limited by this disclosure. In some embodiments, the threshold maintenance distance may be adjusted automatically based on a number of maintenance facilities that are capable of performing the one or more maintenance tasks within the threshold maintenance distance.

In some embodiments, the threshold maintenance distance may be used to determine when a maintenance center may begin to prepare for a particular maintenance item. For example, if a vehicle communicates with a maintenance center that it needs an oil change and a tire rotation, the maintenance center may receive such information along with data associated with the location of the vehicle (e.g., that the vehicle is within a first distance threshold 304 from the maintenance center, that the vehicle is within a second distance threshold of the maintenance center, etc.) and the maintenance center may use this location information to begin preparing for the oil change and the tire rotation when the vehicle is within the second distance threshold 306 and/or the first distance threshold 304 such that the maintenance center can more promptly service the vehicle. More specifically, based on the location of the vehicle, the maintenance center may prepare for one or more of the maintenance items needed by the vehicle.

The threshold time may represent the maximum wait time that a user may be willing to wait for maintenance on or involving his or her vehicle to complete at any given maintenance facility. That is, if a user checks a vehicle in for one or more items of maintenance at 1:00 PM and the vehicle is complete at 2:30 PM, the wait time is ninety minutes. The threshold time may be used to filter one or more maintenance facilities from a user's list of optional maintenance facilities based on maintenance at that facility exceeding the wait time. The wait time may be calculated using wait time data received from one or more of a given maintenance facility, a network of users, a network of vehicles, the Internet, etc. The wait time may reflect the result of one or more functions performed on wait time data (e.g., an average, a mean, a mode, etc.). In some embodiments, wait time is processed externally from the vehicle 300 and the vehicle 300 may receive the result of such processing to determine the wait time. The wait time may be determined using one or more machine learning algorithms. For example, an external server may perform one or more of a supervised learning, clustering, dimensionality reduction, structured prediction, anomaly detection, reinforcement learning algorithms, or any combination thereof, to determine a wait time. In some embodiments, users may be requested for information regarding wait times at maintenance facilities such that human-in-the-loop algorithms are used.

In embodiments, a user may increase the threshold time. For example, the user may change the threshold time calculation to a manual setting using the threshold time input 318 and may change the threshold time based on his or her preference. In some embodiments, the threshold time may default to a particular time in the automatic mode and the default threshold time may be adjustable by the user. In the automatic mode, the threshold time may be adjusted based on an input from one or more of the user's external applications (e.g., a calendar application, a contacts list, an email server, etc.) based on the schedule of the user. For example, if a user has an appointment at 4:00 PM and has two items of maintenance to complete on the vehicle which will take a certain amount of time, the threshold time may be automatically set such that all maintenance facilities that would result in the maintenance causing the user to miss his or her appointment may be filtered.

Maintenance facilities that meet the threshold time criteria may be distinguished from the maintenance facilities that do not meet the threshold time criteria. For example, as shown in FIG. 3, the maintenance facilities that do meet the threshold time criteria appear shaded while the maintenance facilities that do not meet the threshold time criteria are unshaded. As shown in FIG. 3, maintenance facilities 308a, 308c, 308d, 308h, and 308i satisfy the threshold maintenance time. The system 100 may output a maintenance scheduling prompt based on whether the wait time at the maintenance facility meets the wait time threshold. Accordingly, the visual distinction between facilities that do meet the wait time threshold and those that do not may be a useful visual indication of the differing facilities.

The proxy vehicle location 310 may be a location that is substituted for the location of the vehicle in order to determine a convenient maintenance facility. In application, the proxy vehicle location 310 may be, for example, a home or office building of a user of the vehicle 300 that may be visited at a future time. Accordingly, the user can determine maintenance facilities within a proxy threshold distance of the proxy vehicle location. This proxy vehicle location 310 may provide the user with useful information such as, for example, the location of maintenance facilities near where the vehicle 300 may remain for extended periods of time in non-use. A user may, for example, find it useful to drop his or her vehicle off at a maintenance facility near the proxy vehicle location 310 and take a cab to and from the proxy location (e.g., if it is his or her home or work) to drop the vehicle off and pick the vehicle back up after the maintenance is complete. In another example, the vehicle 300 may be an autonomous vehicle and may navigate to a maintenance center after the user arrives at the proxy vehicle location 310 and exits the vehicle (e.g., if the vehicle 300 is waiting in a parking lot for periods of time at the proxy location that are longer than a projected maintenance time at a nearby maintenance facility). In some embodiments, the system 100 may output a maintenance scheduling prompt based on a third comparison between: (i) the magnitude of the distance between the proxy vehicle location 310 and a maintenance facility; and (ii) a proxy distance threshold, which may be a threshold distance surrounding the proxy vehicle location 310.

In embodiments in which the vehicle 300 is an autonomous or semi-autonomous vehicle that is capable of maneuvering autonomously. In such embodiments, the vehicle 300 may automatically select a maintenance location based on selection criteria and/or may autonomously navigate to a selected maintenance location. Example selection criteria may include, but are not limited to, the capability to perform one or more maintenance items, the wait time at a particular maintenance facility, the distance between the vehicle and a maintenance center, the minimum distance between a maintenance center and a vehicle route, whether parking is available at the maintenance center, a user or vehicle owner or operator's maintenance preferences, and the like.

Figure 4:
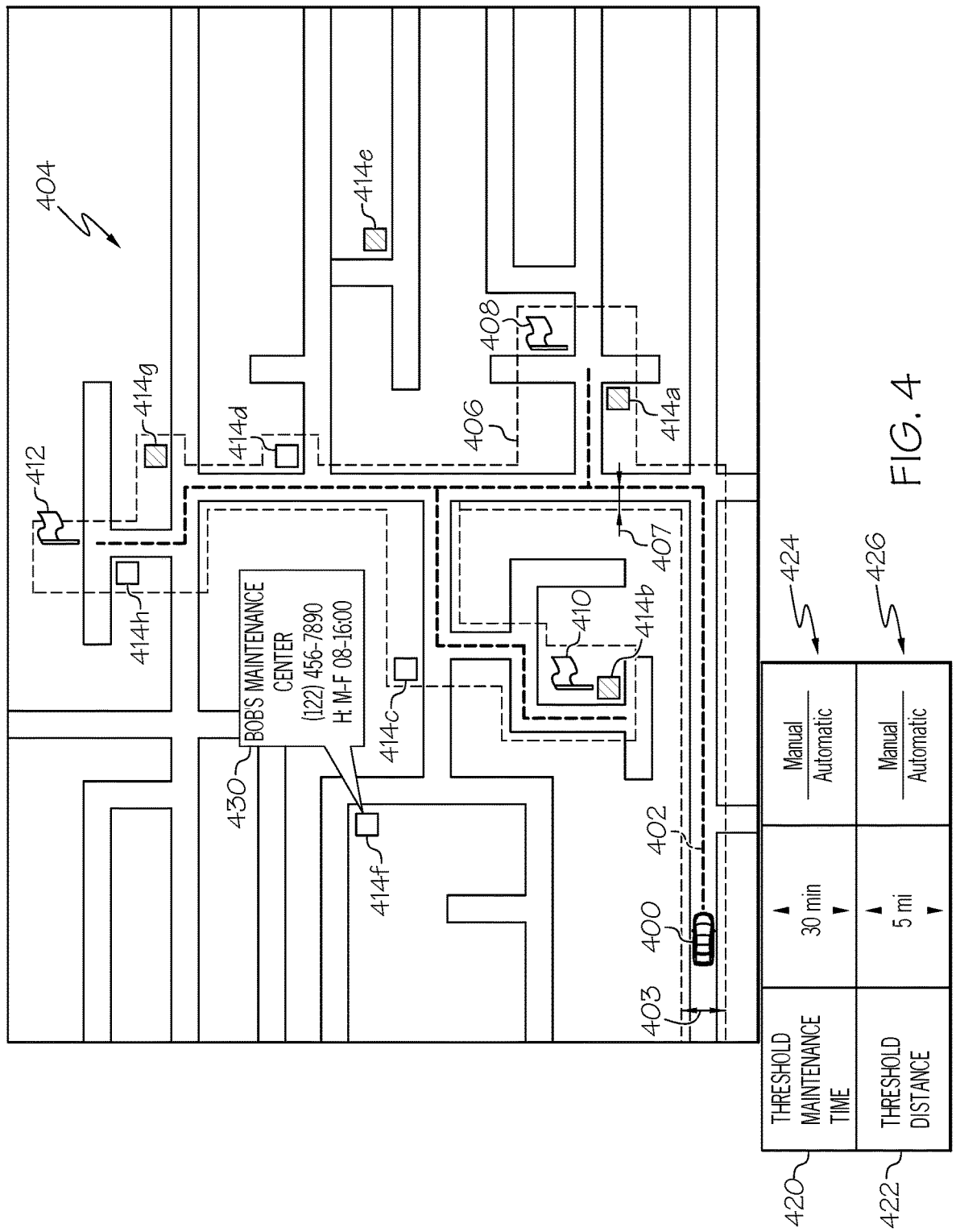
FIG. 4 schematically depicts a second illustrative embodiment of a graphical user interface, according to one or more embodiments shown and described herein.

Referring now to FIG. 4, a vehicle 400 is shown navigating along a vehicle route 402 through a system of streets in a second location 404. The vehicle 400, the system of streets in the second location 404, and the other aspects described with respect to FIG. 4 may be depicted, for example, as a map using the GUI 112 on the display 110 shown in FIGS. 1 and 2. Surrounding the vehicle route 402 is a route threshold 406 which may be a threshold distance 407 away from the vehicle route 402. The threshold distance 407 may be adjustable as described in greater detail herein. In the particular example embodiment shown in FIG. 4, the vehicle route 402 traces between a first waypoint 408, a second waypoint 410, and a third waypoint 412. A first maintenance facility 414a, a second maintenance facility 414b, a third maintenance facility 414c, a fourth maintenance facility 414d, a seventh maintenance facility 414g, and an eighth maintenance facility 414h are depicted inside the route threshold. A fifth maintenance facility 414e and a sixth maintenance facility 414f are depicted outside the route threshold 406. A threshold maintenance time indication indicates the threshold maintenance time. A data card 430 displays data about a maintenance facility. Embodiments may include a threshold maintenance time indicator 420 which may include a threshold time input 424 and a threshold maintenance distance indicator 422, which may include a threshold distance input 426.

The vehicle 400 may follow the vehicle route 402 to travel from the first waypoint 408 to the second waypoint 410 to the third waypoint 412. The vehicle route 402 may be automatically determined, for example, using one or more machine learning algorithms to process data from one or more devices or accounts associated with the user. In some embodiments, one or more data processes or algorithms may be run by an external computer (e.g., the external network 118). For example, the processor 104 and/or an external computing device may process data from one or more of a contact list, an email server, a calendar application, and the like. In some embodiments, the vehicle route 402 may be autonomously or user created using the navigation module 114. The scope of the present embodiments is not limited by the particular examples for planning the vehicle route 402 described herein.

The route threshold 406 may surround the vehicle route 402 at a route threshold distance 403 and may be depicted to a user with the display 110 (e.g., via the GUI 112) to indicate the particular maintenance facilities that fall within the route threshold 406. The route threshold 406 represents an area expanding outward from the vehicle the route threshold distance and surrounds the route. For example, the route threshold distance 403 may be 1 mi, 2 mi, 5 mi, 10 mi, etc. The route threshold distance 403 may be automatically or manually adjusted. In some embodiments, the route threshold distance 403 may be automatically adjusted based on a number of maintenance facilities that are capable of performing one or more maintenance tasks within the route threshold distance Generally, the route threshold distance 403 is set based on the convenience of the user so that he or she may have a visual representation of the maintenance facilities that are within the route threshold 406 so that he or she may more readily determine which maintenance facilities are conveniently located such that the user need not travel further than the route threshold distance from his or her route in order to reach a maintenance facility that is capable of performing the maintenance that the vehicle 400 requires.

Referring to the particular exemplary scenario depicted in FIG. 4, the first maintenance facility 414a, the second maintenance facility 414b, the third maintenance facility 414c, the fourth maintenance facility 414d, the seventh maintenance facility 414g, and the eighth maintenance facility 414h are within the route threshold 406, which may indicate convenience (e.g., a relatively short drive from the route) to the user. The fifth maintenance facility 414e and the sixth maintenance facility 414f are outside the route threshold 406, which may indicate inconvenience to the user. In embodiments, the route threshold 406 may be automatically or manually adjustable. For example, a user may adjust the route threshold 406 using the threshold distance input 426. In embodiments, the threshold time may be automatically or manually adjustable. For example, a user may adjust the threshold time using the threshold time input 424.

In some embodiments, the vehicle 400 may be an autonomous or semi-autonomous vehicle that is capable of maneuvering along the vehicle route 402 between the various waypoints autonomously. In such embodiments, the vehicle 400 may automatically select a maintenance location based on selection criteria and/or may autonomously navigate to a selected maintenance location. Example selection criteria may include, but are not limited to, the capability to perform one or more maintenance items, the wait time at a particular maintenance facility, the distance between the vehicle and a maintenance center, the minimum distance between a maintenance center and a vehicle route, whether parking is available at the maintenance center, a user or vehicle owner or operator's maintenance preferences, and the like. The minimum distance between a maintenance center and the vehicle route may be, for example, the shortest distance between any portion of the vehicle route and a maintenance facility. In some embodiments, the system 100 may determine a vehicle route and may output a maintenance scheduling prompt based on a comparison of the distance between: (i) the magnitude of the minimum distance between the vehicle route and the maintenance facility; and (ii) a route threshold.

Figure 5:
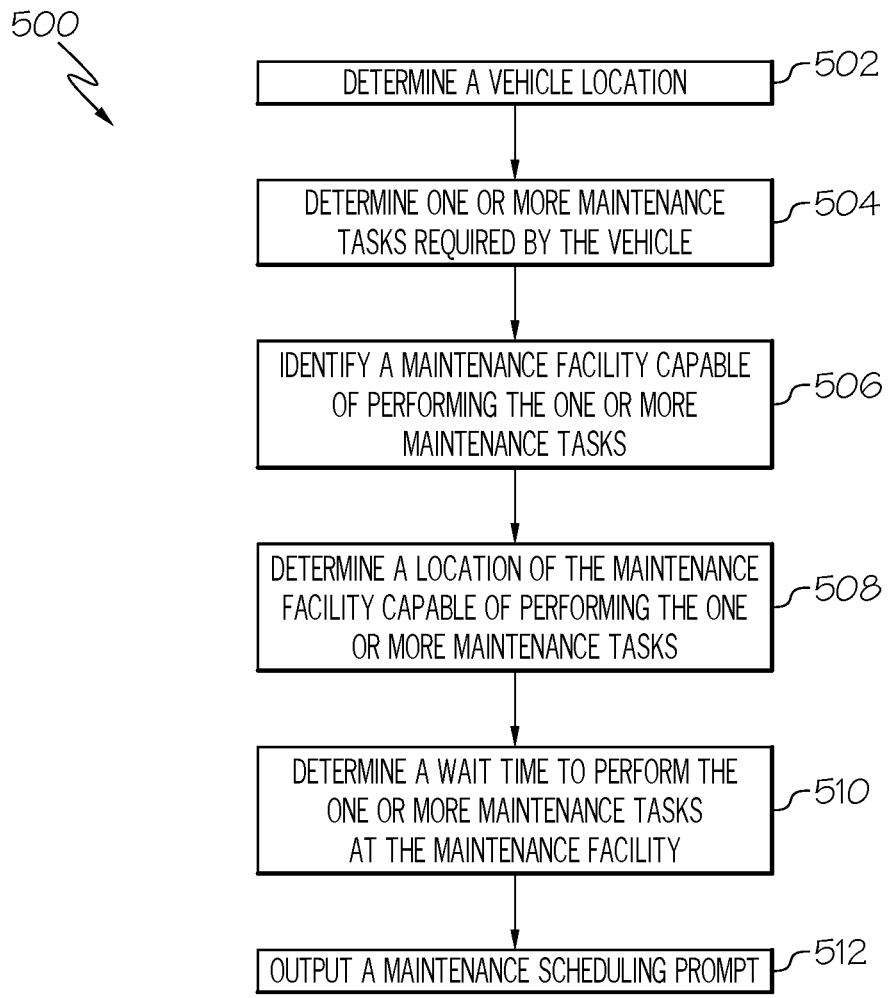
FIG. 5 schematically depicts a flow chart showing a method of prompting vehicle service based on a proximity of the vehicle to a service center and a wait time, according to one or more embodiments shown and described herein

FIG. 5 depicts a method 500 of prompting vehicle service based on a proximity and wait time. While the particular example embodiment depicted includes six steps, it is to be understood that embodiments may include any number of steps. The method 500 may be executed based on instructions stored in the memory module 106 that are executed by the processor 104 and/or an external computing device, for example.

At block 502, the system 100 may determine a vehicle location. The system 100 may determine the vehicle location using, for example, the position locating hardware of the navigation module 114 described herein. In embodiments, the vehicle location may be displayed graphically to a user using the display 110 (e.g., as the vehicle 300 in FIG. 3 or the vehicle 400 in FIG. 4). For example, the location may be displayed relative to one or more other icons or images on a graphical user interface (GUI), as shown in FIGS. 3-4. In other embodiments, the system 100 may substitute the proxy vehicle location as described above for the location of the vehicle 10. The proxy vehicle location may be used, for example, as a proxy to determine maintenance facilities that may be in the vicinity of a usual location of the vehicle 10 (e.g., a garage in which the vehicle 10 may be routinely stored, etc.) or a future location that the vehicle is scheduled to visit. By determining a distance from a proxy vehicle location to a maintenance facility, the system 100 may determine a best place for maintenance based on the usual location of the vehicle 10.

At block 504, the system 100 may determine one or more maintenance tasks required by the vehicle 10. Required maintenance tasks may be recorded in a memory device, such as the memory module 106. One or more applications may be run to determine the one or more maintenance tasks, for example, using the processor 104. In some embodiments, the one or more maintenance tasks may be stored in a lookup table, for example. In some embodiments, the required maintenance tasks may be stored in an external server or network. For example, the maintenance tasks may be stored in a server that is monitored or controlled by a manufacturer of the vehicle and that contains a list of maintenance items that is routinely updated based on fleet-wide statistics. For example, if it is determined that an entire fleet of sedans created by a particular manufacturer need an update or maintenance item, this information may be received by the vehicle 10 (e.g., using the network interface hardware 116) and the vehicle may determine that one or more maintenance tasks are required. In embodiments, maintenance items needed for a particular vehicle, class, model, year make, etc., may be determined based on crowd-sourced information, such as, for example, message boards, surveys, and the like. An external network may use such crowd-sourced information, in combination with, for example, one or more machine learning algorithms, to determine an optimum maintenance schedule for the particular vehicle, class, model, year make, etc. and this data may be used by the vehicle 10 to determine one or more maintenance tasks required by the vehicle 10. In some embodiments, the maintenance tasks may be recommended or preferred, rather than strictly required. In some embodiments, maintenance tasks to be performed may be determined by the vehicle diagnosis systems (e.g., when a maintenance required determination is made). In some embodiments, maintenance tasks to be performed may be determined based on a determination that the vehicle has reached a particular mileage indicator (e.g., particular oil change threshold, tire rotation threshold, etc.).

At block 506, the system 100 may identify one or more maintenance facilities that are capable of performing the one or more maintenance tasks. The maintenance facilities capable of performing the tasks may be determined by accessing a database that indicates the particular task to be performed and identifies the facilities listed as capable of performing the task. The maintenance facilities may be identified using one or more machine learning algorithms and processing data that may be collected and distributed amongst users of the vehicle 10 and similar vehicles connected to one or more external vehicles or external networks. In some embodiments, maintenance facilities may update information on a server with their capabilities and the system 100 may use such a list to identify maintenance facilities capable of performing required maintenance items. In some embodiments, the maintenance facility information may be updated automatically with one or more machine-learning algorithms. In some embodiments, the operator or agent of a maintenance facility may pay to have the operator or agent-represented maintenance facility emphasized to a user of the system 100 such that the particular maintenance facility may be more readily identified by the system 100. For example, if there are three maintenance facilities capable of performing maintenance items required by a particular vehicle within a given distance and one of the maintenance facilities has paid to emphasize their services while the other two have not, the maintenance facility that has paid for emphasized services may appear larger or otherwise more noticeable to the user of the system 100 (e.g., near the top of a list of maintenance facilities, and the like) making it more likely that a user will select this particular maintenance facility. In some embodiments, identification of a maintenance facility capable of performing one or more maintenance tasks may be based on a comparison between one or more user maintenance preferences and maintenance facility capabilities.

At block 508, the system 100 may determine a location of the one or more maintenance facilities capable of performing the one or more maintenance tasks. The location of the maintenance facilities may be stored, for example, in a memory such as the memory module 106 or an external memory accessible by the vehicle 10 and/or the external network 118. The location of the maintenance facilities may be determined based on this stored information and displayed on the display 110 using the GUI 112. In some embodiments, the location of the maintenance facility may be compared with the location of the vehicle 10 (e.g., as determined by the navigation module 114 or some other component capable of determining a location of the vehicle) and the maintenance facility may commence preparing for maintenance needed by the vehicle 10 before the vehicle 10 physically arrives at the location. For example, in one embodiment, the system 100 may determine that the vehicle 10 needs a tire rotation and an oil change. The system 100 may determine the location of the vehicle 10 and may determine a first distance threshold 304 and/or a second distance threshold 406. Based on the maintenance facility receiving information the vehicle 10 is within one or more of the first distance threshold 304 and the second distance threshold 306, the maintenance center may begin preparing for the particular maintenance items required by the vehicle 10. For example, the maintenance center may reset oil changing tools or prepare a vehicle jack to accept the vehicle 10 such that the vehicle 10 can be raised and a maintenance operator can operate beneath the vehicle 10.

At block 510, the system 100 may determine a wait time to perform the one or more maintenance tasks at the one or more maintenance facilities. The wait time to perform one or more maintenance tasks may be determined based on, for example, data associated with a personal electronic device of multiple users at the maintenance facility. For example, if a customer having a personal electronic device is waiting at the maintenance facility, the location of that personal electronic device may be determined (e.g., by a connection with a cell tower near the maintenance facility, via a Wi-Fi connection with a router at the maintenance facility, and the like) and the location tracked to determine when the personal electronic device arrives at and leaves from the maintenance facility location. In other embodiments, the wait time at a particular location may be based on user feedback (e.g., customer surveys, etc.). In other embodiments, wait times may be tracked by a maintenance facility (e.g., as it completes particular maintenance items) and these times may be uploaded to a database and distributed accordingly. The wait times may be specific to individual maintenance items or may be based on the average amount of time that any particular user stays at the maintenance facility without regard to the particular maintenance items that are completed.

At block 512, the system 100 may output a maintenance scheduling prompt. The maintenance scheduling prompt may be based on, for example, one or more of a comparison between the wait time and a wait time threshold and a second comparison between: (i) a magnitude of the distance between the vehicle and the maintenance facility and (ii) a distance threshold.

The wait time threshold may be determined, for example, using a user input through the user input device 124. In some embodiments, the wait time threshold may be determined automatically. For example, the wait time threshold may be determined automatically by connecting with a user's communications and/or calendar applications via an external connection with a device of the user (e.g., via the network interface hardware 116), scraping the user's communications and/or calendar applications, and using a machine-learning algorithm to analyze the scraped data to determine how long a user has to wait on a given maintenance facility. The wait time threshold may be adjusted manually and/or automatically once it has been determined. The wait time threshold is compared to the wait time at a given maintenance facility. The wait time at the given maintenance facility may be an average wait time as historically reported by customers and/or employees of the maintenance facility, may be a wait time as self-reported by the maintenance facility (e.g., the maintenance facility may periodically update a database with a wait time), or may be determined in some other way. In embodiments in which the wait time is updated to a database, the system 100 is capable of accessing the database. Once the system has determined the wait time and the wait time threshold it compares the two values. Maintenance facilities that do not meet the particular wait time threshold may be eliminated from consideration as a potential maintenance facility for performing repairs or may be stored as a potential maintenance facility for consideration at a later point.

The system 100 may determine the distance to a given maintenance facility and it may compare the distance to the distance threshold. In some embodiments, the system 100 may determine the maintenance facility without regard to whether or not a given maintenance facility meets the wait time threshold. However, in some embodiments the wait time threshold may be a filter, such that the system 100 does not calculate the distance to a maintenance facility that does not meet a wait time threshold. To compare the magnitude of the distance between vehicle and the maintenance facility with the distance threshold, the system 100 may determine the distance using, for example, an external database that includes the location of the maintenance facility and the current location of the vehicle 10. The current location of the vehicle 10 may be determined, for example, using the navigation module 114. The location of maintenance facilities may be stored externally (e.g., in an external database) or internally to the vehicle 10. The location of maintenance facilities may be stored in a look-up table or other data table as geographic coordinates, a street address, or other form of logging a position. In embodiments, the navigation module 114 may be used to calculate an "as driven" distance to the maintenance facility (e.g., the distance along a route possible for the vehicle 10 to follow along road or other throughfare, etc.), a distance "as the crow flies," or using some other method for calculating distance. The distance calculated or otherwise determined to a particular maintenance facility is compared to the threshold distance such that maintenance facilities outside the threshold distance are filtered from consideration as a possible maintenance facility for performing maintenance.

In some embodiments, the system 100 may show these filtered results as potential candidates based on one or more criteria. For example, if no maintenance facilities meeting either or both of the wait time threshold and the distance threshold are determined, the system 100 may increase either or both of the wait time threshold and the distance threshold until a maintenance facility meeting the increased threshold values is determined. In some embodiments, an increase in the wait time threshold and/or the distance threshold may be based on a determined criticality of the maintenance. That is, some maintenance may be more critical to vehicle operation than other maintenance (e.g., fixing a flat tire that is significantly below standard operating pressure may be more critical to immediate vehicle operation than changing engine oil at the precisely recommended mileage). The criticality of the maintenance may be determined, for example, based on a fault code or other reading as reported by systems accessing sensor data from on-board sensors (e.g., tire pressure sensors, light sensors, reflexive sensors, etc.). In some embodiments the system may recommend expanding a wait time or distance threshold to the user based on the criticality of the maintenance.

The comparison results between the wait time and the wait time threshold and the distance between the maintenance facility and the vehicle and the distance threshold may be used to list recommended maintenance facilities. In some embodiments, the comparison results between the wait time and the wait time threshold and the distance between the maintenance facility and the vehicle and the distance threshold may be ranked and/or sorted for the user to conveniently select a maintenance facility. That is, the maintenance facility with the shortest wait time and/or that is the shortest distance from the vehicle may be recommended to the user or otherwise presented to the user ahead of other maintenance facilities with longer wait times and/or that are further away from the vehicle 10.

The maintenance scheduling prompt may give the user or system 100 information such as an identification of the maintenance item required and may offer information as to why the maintenance item is required. In some embodiments, the maintenance scheduling prompt may allow the user to view directions to one or more maintenance facilities or to select a particular maintenance facility from a list of multiple maintenance facilities. In some embodiments, the closest maintenance facility capable of performing the user's necessary maintenance may be automatically selected and directions to the maintenance facility may be generated using the navigation module 114, for example.

In some embodiments, the system 100 may be configured to generate a second wait time threshold. For example, if the system 100 cannot determine a maintenance center within a threshold distance that meets a user-determined wait time threshold or the first wait time threshold, the system may automatically readjust the wait time threshold to a second wait time threshold. In some embodiments, the second wait time threshold may be based on an average of two or more of the wait times at various maintenance centers. For example, the system may calculate an average of three shortest wait times at maintenance centers and may automatically adjust a wait time threshold to the average of the three shortest wait times. It is to be understood that a wait time at any number of maintenance centers may be used to determine a wait time threshold. In some embodiments, the system 100 may output a scheduling prompt based on a comparison between a wait time at a given maintenance facility and the second wait time threshold. That is, the system 100 may determine the wait time at a given maintenance facility and may output a maintenance scheduling prompt for the given maintenance facility if the wait time is below the second wait time threshold, which may have been adjusted from the first wait time threshold. In some embodiments, the wait time threshold may be automatically changed to the second wait time threshold and the second wait time threshold may be an average of three shortest wait times at maintenance facilities within the distance threshold. For example, if the user of the system desires a particular wait time threshold to be used to determine a maintenance facility to perform a given item of maintenance, but no maintenance facility can complete the maintenance within the customer's desired wait time, the wait time threshold may be automatically adjusted to a second wait time threshold that is longer than the first wait time threshold so that at least one maintenance facility may be presented to the user that is capable of performing the maintenance. In such a scenario, it may still be advantageous to the user to have multiple options of maintenance facilities to choose from. Accordingly, the three shortest wait times at maintenance facilities within or outside of the threshold distance may be determined and these three wait times may be averaged. Any maintenance facility with a wait time shorter than the average may be reported to the user. The average of three wait times is merely an example, and it is to be understood that other computations for adjusting the threshold wait time to a second threshold wait time are considered (e.g., average wait times, median wait times, etc.) and that any number of maintenance facilities can be used in the calculation (i.e., not just three).

It should now be understood that vehicles may include one or more systems for prompting vehicle service based on a proximity and a wait time, for example, a proximity of the vehicle to a service center and a wait time at the service center. Such systems may include one or more sensors for determining the location of the vehicle. For example, a GPS system may determine a location of a vehicle and generate GPS data based on the location of the vehicle. The vehicle may be further configured to determine a location of one or more maintenance centers. For example, the vehicle may be configured to receive data from an external network that may be used to determine the location of one or more maintenance centers and, in some embodiments, to display the location of the maintenance centers on a display. Additionally, the vehicle may be configured to determine a wait time at particular maintenance centers. For example, the vehicle may be configured to receive data from an external network that may be used to track the wait time at particular maintenance centers. Based on a determination of the vehicle, a maintenance center, and a wait time at a maintenance center, the vehicle may prompt one or more vehicle maintenance items (e.g., oil change, tire pressure increase or decrease, tire rotation, etc.).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   determining a proxy vehicle location, the proxy vehicle location is a future location of a vehicle to visit;
   selecting a maintenance facility of a plurality of maintenance facilities capable of performing one or more maintenance tasks required by a vehicle based on:
   (i) a plurality of magnitudes of distance between the proxy vehicle location and the plurality of maintenance facilities; and
   (ii) a plurality of wait times for the plurality of maintenance facilities to perform the one or more maintenance tasks;
   comparing the plurality of magnitudes of distance to a distance threshold to select the maintenance facility located within the threshold distance;
   automatically adjusting the distance threshold using one or more machine learning algorithms based on a preference of a user;
   in response to the selection of the maintenance facility, automatically sending information regarding the one or more maintenance tasks required by the vehicle and a location of the vehicle to the selected maintenance facility; and
   autonomously navigating the vehicle from the proxy vehicle location to the selected maintenance facility in response to determining that the vehicle stays in the proxy vehicle location longer than a projected maintenance time at the selected maintenance facility.

2. The method of claim 1, further comprising:
   comparing the plurality of wait times to a time threshold to select the maintenance facility with a wait time within the time threshold;
   automatically adjusting the time threshold using one or more machine learning algorithms based on a schedule of a user; and
   outputting a maintenance scheduling prompt based on a comparison between the wait time and the threshold wait time.

3. A system comprising:
   a processor;
   a memory module communicatively coupled to the processor and including one or more processor-readable instructions that, when executed by the processor, cause the system to:
   determine a proxy vehicle location, the proxy vehicle location is a future location of a vehicle to visit;
   select a maintenance facility of a plurality of maintenance facilities capable of performing one or more maintenance tasks required by a vehicle based on:
   (i) a plurality of magnitudes of distance between the proxy vehicle location and the plurality of maintenance facilities; and
   (ii) a plurality of wait times for the plurality of maintenance facilities to perform the one or more maintenance tasks;
   compare the plurality of magnitudes of distance to a distance threshold to select the maintenance facility located within the distance threshold;
   automatically adjust the distance threshold using one or more machine learning algorithms based on a preference of a user;
   in response to selection of the maintenance facility, automatically send information regarding the one or more maintenance tasks required by the vehicle and a location of the vehicle to the selected maintenance facility; and autonomously navigate the vehicle from the proxy vehicle location to the selected maintenance facility in response to determining that the vehicle stays in the proxy vehicle location longer than a projected maintenance time at the selected maintenance facility.

4. The system of claim 3, wherein the one or more processor-readable instructions further cause the system to:
compare the plurality of wait times to a time threshold to select the maintenance facility with a wait time within the time threshold; and
automatically adjust the time threshold using one or more machine learning algorithms based on a schedule of a user.

5. The system of claim 3, wherein the one or more processor-readable instructions further cause the system to select the maintenance facility based on a comparison between (i) a plurality of minimum distances between one or more points along a vehicle route to a waypoint and (ii) the plurality of maintenance facilities; and a route threshold, wherein the route threshold is manually adjustable.

6. The system of claim 3, wherein the one or more processor-readable instructions further cause the system to select the maintenance facility based on a comparison between (i) a plurality of minimum distances between one or more points along a vehicle route to a waypoint and the plurality of maintenance facilities and (ii) a route threshold, wherein the one or more processor-readable instructions further cause the system to adjust the route threshold based on a number of maintenance facilities that are capable of performing the one or more maintenance tasks within the route threshold.

7. The system of claim 3, wherein selection of the maintenance facility capable of performing the one or more maintenance tasks is based on a comparison between one or more user maintenance preferences and maintenance facility capabilities.

8. The system of claim 4, wherein the one or more processor-readable instructions further cause the system to:
output a maintenance scheduling prompt based on a comparison between the wait time and the time threshold.

9. The system of claim 8, wherein the one or more processor-readable instructions further cause the system to select the maintenance facility based on a comparison between the plurality of magnitudes of distance to the distance threshold, wherein the wait time threshold is automatically adjusted to the second wait time threshold and the second wait time threshold is an average of three shortest wait times at maintenance facilities within the distance threshold.

10. The system of claim 3, wherein the one or more processor-readable instructions further cause the system to:
select the maintenance facility based on:
a comparison between a wait time of the plurality of wait times and a time threshold; and
a comparison between (i) a plurality of minimum distances between one or more points along a vehicle route to a waypoint and the plurality of maintenance facilities and (ii) a route threshold;
determine a criticality of the one or more maintenance tasks required by the vehicle; and
adjust at least one of the time threshold, the distance threshold, and the route threshold in response to the criticality of one or more maintenance tasks being greater than a threshold criticality.

11. The system of claim 3, wherein the one or more processor-readable instructions further cause the system to:
output a maintenance scheduling prompt based on the plurality of maintenance facilities; and
receive a selection of the maintenance facility in response to the output of the maintenance scheduling prompt.

12. The system of claim 3, wherein the schedule of the user is determined based on data on an electronic device associated with the user.

13. A vehicle comprises:
a processor;
a memory module communicatively coupled to the processor and including one or more processor-readable instructions that, when executed by the processor, cause the vehicle to:
determine a proxy vehicle location, the proxy vehicle location is a future location of a vehicle to visit;
select a maintenance facility of a plurality of maintenance facilities capable of performing one or more maintenance tasks required by the vehicle based on:
(i) a plurality of magnitudes of distance between the proxy vehicle location and the plurality of maintenance facilities; and
(ii) a plurality of wait times for the plurality of maintenance facilities to perform the one or more maintenance tasks;
compare the plurality of magnitudes of distance to a distance threshold to select the maintenance facility located within the distance threshold;
automatically adjust the distance threshold using one or more machine learning algorithms based on a preference of a user;
in response to the selection of the maintenance facility, automatically send information regarding the one or more maintenance tasks required by the vehicle and a location of the vehicle to the selected maintenance facility; and
autonomously navigate the vehicle from the proxy vehicle location to the selected maintenance facility in response to determining that the vehicle stays in the proxy vehicle location longer than a projected maintenance time at the selected maintenance facility.

14. The vehicle of claim 13, wherein the one or more processor-readable instructions further cause the vehicle to:
compare the plurality of wait times to a time threshold to select the maintenance facility with a wait time within the time threshold; and
automatically adjust the time threshold using one or more machine learning algorithms based on a schedule of a user.

15. The vehicle of claim 13, wherein the one or more processor-readable instructions further cause the vehicle to:
output a maintenance scheduling prompt based on a comparison between (i) the plurality of magnitudes of distance between the proxy vehicle location and the plurality of maintenance facilities and the threshold distance.

16. The vehicle of claim 13, wherein the one or more processor-readable instructions further cause the vehicle to select the maintenance facility based on a comparison between (i) a plurality of minimum distances between one or more points along a vehicle route to a waypoint and the plurality of maintenance facilities and (ii) a route threshold, wherein the one or more processor-readable instructions further cause the vehicle to adjust the route threshold based on a number of maintenance facilities that are capable of performing the one or more maintenance tasks within the route threshold.

17. The vehicle of claim 14, wherein the one or more processor-readable instructions further cause the vehicle to:
   output a maintenance scheduling prompt based on a comparison between the wait time and the time threshold.

18. The vehicle of claim 17, wherein the time threshold is automatically adjusted to a second time threshold and the second time threshold is an average of three shortest wait times at maintenance facilities within the distance threshold.

\* \* \* \* \*